(No Model.) 2 Sheets—Sheet 1.
A. JORGENSEN.
COMPRESSED AIR MOTOR.
No. 402,838. Patented May 7, 1889.
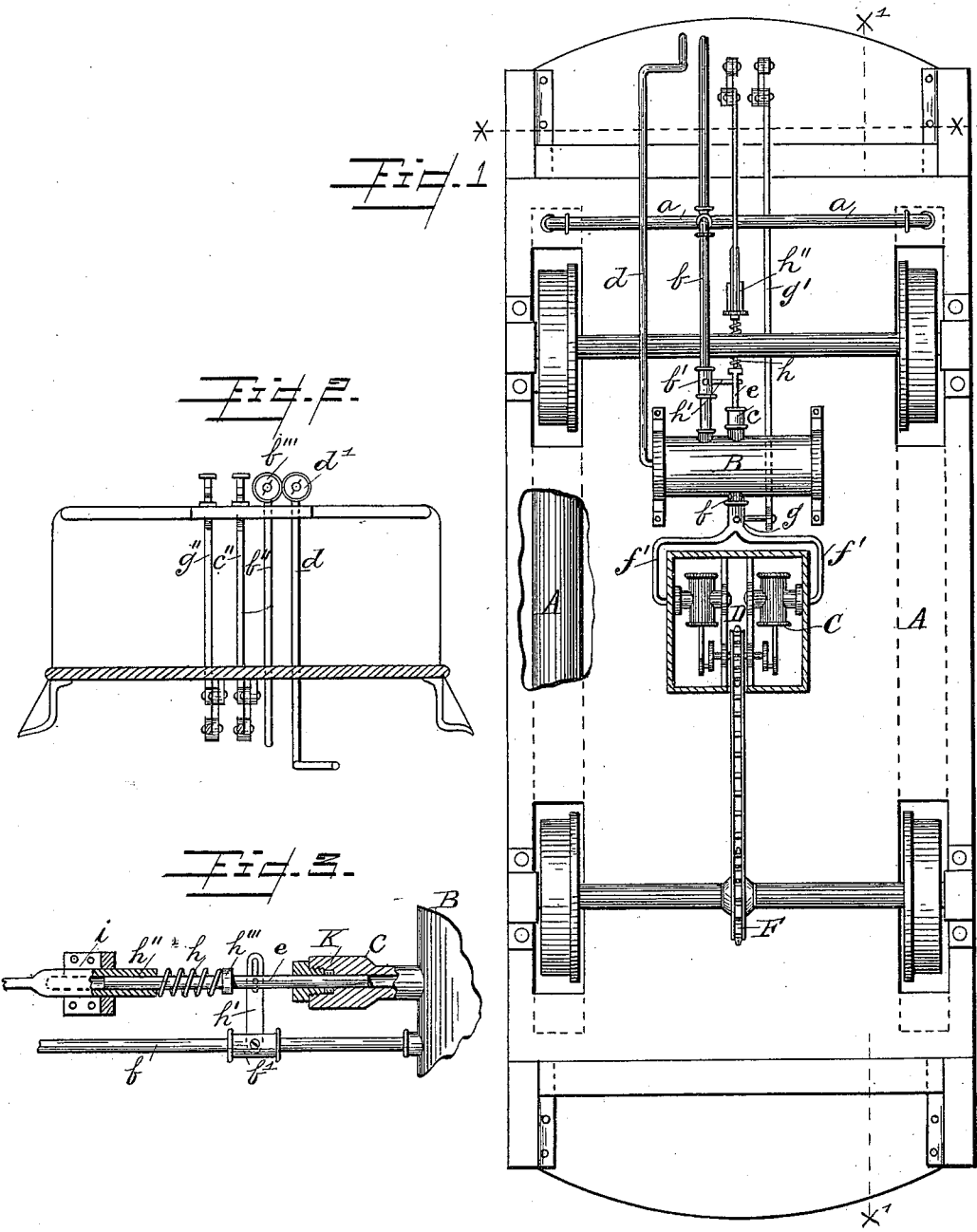
WITNESSES
Jos H Blackwood
W. G. Doolittle
INVENTOR
Axel Jorgensen
by Wm H Doolittle
Attorney

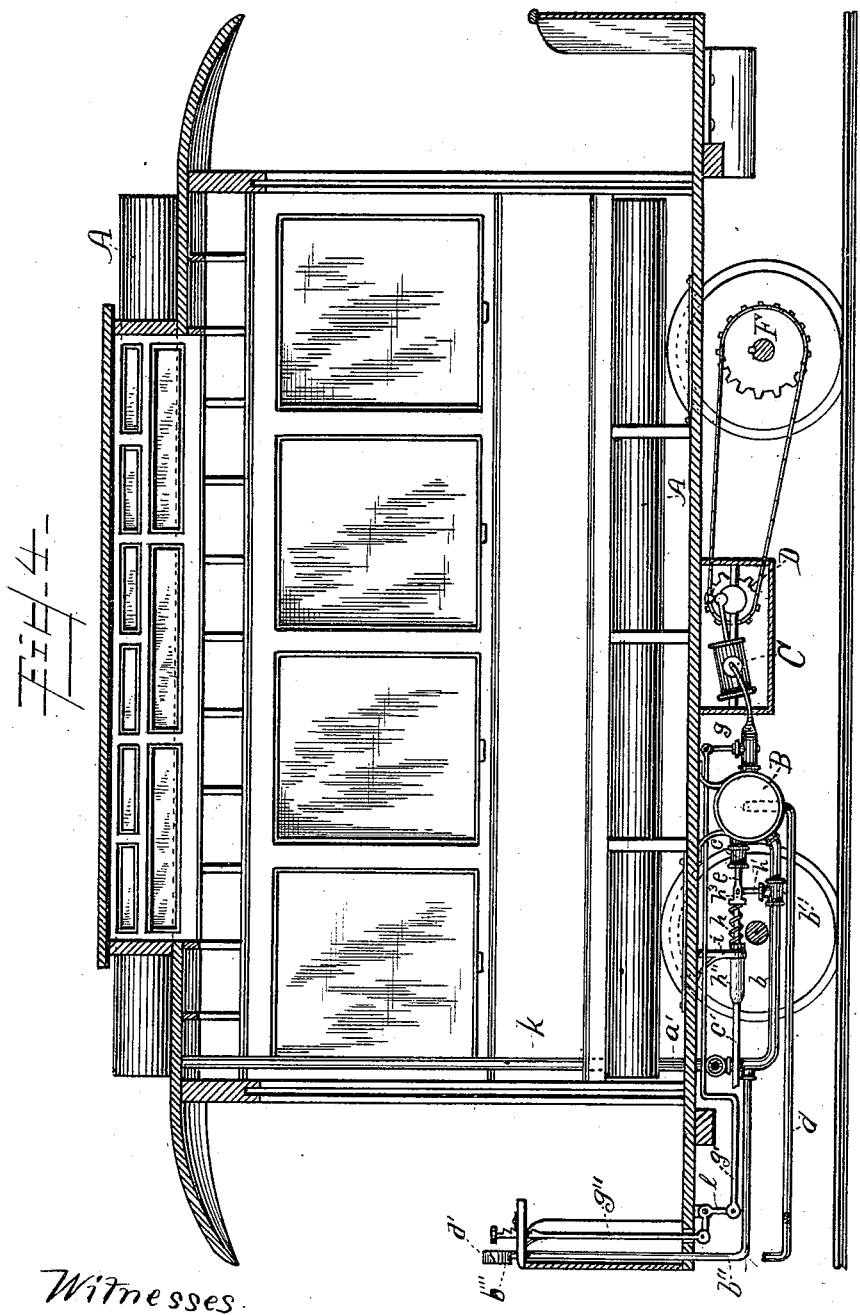

UNITED STATES PATENT OFFICE.

AXEL JORGENSEN, OF DES MOINES, IOWA.

COMPRESSED-AIR MOTOR.

SPECIFICATION forming part of Letters Patent No. 402,838, dated May 7, 1889.

Application filed August 13, 1888. Serial No. 282,691. (No model.)

*To all whom it may concern:*

Be it known that I, AXEL JORGENSEN, of Des Moines, in the county of Polk and State of Iowa, have invented a certain new and useful machine, device, and combination as a means for using compressed air as a motive power in propelling street-cars, other cars, vehicles, and machinery of all kinds, of which the following is a specification.

Generally my invention consists of one or more accumulators or reservoirs made of suitable material, in which is stored compressed air introduced through an orifice or valve at any convenient part thereof, which may be of such density or degree of compressure as may be needed for the car, vehicle, or machinery to be propelled. As applied to a street-car, for instance, the accumulators or reservoirs may be cylindrical and ten feet in length and ten inches in diameter, or any other length or diameter or form desired, and as applied to such car they may be used in duplicate or quadruplicate, one on either side of the car, on the top of it, or under the seat on either side, or under the car, or other position—horizontal, perpendicular, or otherwise—as may be found most convenient, and connected by pipe with each other or with the equalizer direct, as desired, together with an auxiliary reservoir or equalizer made of suitable material, which is placed between the accumulators or reservoirs, as described above, and the engine, as hereinafter described, and to be connected with each, as hereinafter particularly described. As applied to a street-car, for instance, the auxiliary reservoir may be cylindrical in form and of ten inches in diameter and two feet in length, or any other diameter or length desired, or the auxiliary reservoir may be made in a square or globular, tubular, or any other form or dimensions. This auxiliary reservoir may be located under and crosswise of the car or other suitable position and convenient to the engine or propelling machinery. This auxiliary reservoir is connected directly with one or all of the accumulators or reservoirs by pipe with a valve to regulate the supply of air from the accumulators or reservoirs to the auxiliary reservoir, as desired, and is also connected with the engine or propelling machinery.

My engine or propelling machinery (as applied to street-cars) is about sixteen by thirty inches, or other larger, smaller, or different size and form. The size named is located under the street-car immediately forward of the auxiliary reservoir. The piston-rods are about twenty-one inches from center to center, the cylinders about three and one-half inches by three and one-half inches, oscillating and with oscillating valves. The connection of the piston-rods with the axle of the car may be direct, by cog-wheels, sprocket-wheels with chains, or other known device for connecting machinery with shafts or axles. Into this engine the compressed air is introduced from the auxiliary reservoir by means of a pipe in which is fixed the throttle-valve by which the use of the compressed air is controlled.

Having thus described generally in outline my invention, I do hereby declare that the following is a full, clear, and accurate description of my invention, which will enable others skilled in the art to which it pertains to make and use the same, reference being had to the accompanying drawings, which form a part of this specification.

My invention consists in the devices, features, and combinations hereinafter specified and claimed.

Figure 1 is my invention attached to the bottom of a street-car, with the bottom of the iron box containing the engine removed. A A are two accumulators or reservoirs placed under the seats of the car longitudinally, (shown by dotted lines,) with a section of the bottom of one side of the car broken away, showing a section of the accumulator or reservoir in place on that side. $a$ is a horizontal pipe extending across the car, connected by perpendicular pipes $a'$ and $a'$, as shown by Fig. 4, with the reservoirs or accumulators on each side of the car, by means of which the compressed air is conducted to pipe $b$, and thence to the auxiliary reservoir B, passing through the valve $b'$, which valve is controlled by the governor, as shown by Fig. 3 and hereinafter described. B is my auxiliary reservoir, into which the compressed air is introduced through pipe $b$ and valve $b'$ and pipes $a$ and $a'$. The forward part of pipe $b$ extends to the driver's platform and connects with the gage shown in Fig. 2.

$c$ is a tube, into which is fitted the piston-rod $e$, with a closely-fitting head, which may be six inches or more in length. Upon the rod $e$ is a spiral spring, $h$, extending from the lever $h'$ of the valve $b'$ to the sleeve $h''$, which is moved by means of the rod $c''$, to which is attached the lever, as shown in Fig. 2. $d$ is a pipe leading from the auxiliary reservoir to the driver's platform, connected with the gage shown in Fig. 2. C is my engine, which is constructed in the manner hereinbefore generally stated; or it may be constructed after any approved method for the construction of steam or compressed-air engines or motors. Connected with this engine is the pipe $f$, leading from the auxiliary reservoir B to the point of division into pipes $f'$ and $f'$, leading to the respective cylinders of the engine. In pipe $f$ is the throttle-valve $g$, which is operated by means of the rod $g'$, extending to the driver's platform, and having upon it an angle-lever, as shown in Figs. 1 and 2. D is a sprocket-wheel on the crank-shaft of the engine, connected by chain with the sprocket-wheel F, which is firmly attached to the axle of the car. The size of these sprocket-wheels will be such abstractly and relatively as the nature of the route to be traversed or the machinery to be operated may require.

Fig. 2 is a sectional view of the driver's platform on the dotted line $x$. Pipe $d$, to which is attached gage $d'$, leads to the auxiliary reservoir B, and the gage indicates the degree of air-pressure in the auxiliary reservoir B. Pipe $b$, to which is attached the gage $b'''$, is a continuation of pipe $b$, (shown in Fig. 1,) which connects, through pipe $a$ and $a'$, with the reservoirs or accumulators A A and indicates the degree of air-pressure therein. Rod $c''$, Fig. 2, is a continuation of rod $c'$ in Fig. 4 and is connected therewith by an angle-lever, as shown in Figs. 1 and 2. On rod $c''$ near its top are ratchet-teeth—such as $c^3$—suited to a spring-pawl—such as $c^4$—fastened to the front of the driver's platform. Rod $g''$ is a continuation of rod $g'$ in Fig. 1, and is connected therewith by an angle-lever, as shown in Figs. 1 and 2. Near the top of this rod are ratchet-teeth suited to a spring-pawl fastened to the front of the driver's platform.

Fig. 3 is my automatic governor, whereby the supply of air into the auxiliary reservoir is controlled. $c$ is a tube fitted into the auxiliary reservoir B, into which tube is closely fitted, with packing, a piston-rod, $e$, which is connected by a pin in slot-lever $h'$ to a valve, $b'$, on pipe $b$, through which the air is supplied from the reservoir to the auxiliary reservoir. On this piston-rod is a spiral spring, $h$, between the collar $h'''$ and the sleeve $h''$. $i$ is the support for the sleeve and rod, and is fastened to the bottom of the car by means of bolts or screws. The amount of air supplied from the reservoir to the auxiliary reservoir is regulated by the valve $b'$, and its automatic movement by the pressure of the air in the auxiliary reservoir B upon the head of the piston-rod $e$. The quantity of air or degree of pressure may be increased by pressing the sleeve $h''$ upon the spiral spring $h$ by means of the rod $c''$ and the angle-lever connected therewith.

Fig. 4 is my invention attached to a street-car, one side thereof being removed, disclosing a section view on the dotted line $x'$ $x'$ of Fig. 1, with the side of the engine-box removed. A A are accumulators or reservoirs, one under the seat and one on top of the car, having, respectively, companions on the opposite side, the former only being shown in Fig. 1. The vertical pipe $a'$, leading from the lower accumulator or reservoir to the transverse pipe $a$, and pipe $k$, connecting the accumulator or reservoir on top of the car with the pipe $a$, were not shown in Fig. 1, but in Fig. 4 are made fully to appear. The angle-lever $l$, by which the throttle-valve is controlled through rod $g'$, is also fully shown in Fig. 4.

I am aware that a compressed-air motor is old in which is used a main air-tank for holding the compressed air, mounted on wheels, combined with an air-engine connected with the wheels, an auxiliary air-tank connected with the main air-tank and the engine, a governor for automatically regulating the passage of air from the main to the auxiliary tank, pipes controlled by valves connecting the engine and auxiliary tank, so that compressed air can be conducted from the auxiliary tank to the engine to propel the car or from the engine to the auxiliary tank to aid in stopping the car, and connecting-rods leading to either end of the car and connecting with a valve to control the supply of air from the auxiliary tank to the engine; but my invention consists of the adaptation of particular means whereby the necessary supply of air from the main and auxiliary tanks to the engine to operate the car can be accurately determined and controlled from the platform.

What I claim as my invention, and desire to secure by Letters Patent, is—

In a compressed-air motor, reservoir A, auxiliary reservoir B, engine C, governor K, provided with the spring, collar $p^3$, sleeve $p^2$, and piston-rod $e$, sprocket-wheels D and F, chain connecting the sprocket-wheel on the engine with the sprocket-wheel on the axle of the car, gage $d'$, gage $b'''$, valve $b'$, valve $g$, lever $g'$, with ratchet and spring-pawl operating said lever, and lever $c''$, with ratchet and spring-pawl for operating the same, and the air-pipes connected with said main and auxiliary reservoirs, gages, and the platform for the purpose of operating a street-car and the propelling machinery, all substantially as herein described.

AXEL JORGENSEN.

Witnesses:
W. W. COLE,
L. E. MOYER.